United States Patent
Grantz et al.

[11] Patent Number: 5,982,061
[45] Date of Patent: Nov. 9, 1999

[54] SPINDLE MOTOR WITH TWO-PIECE SHAFT AND CONNECTOR

[75] Inventors: Alan Lyndon Grantz, Aptos; Anthony Joseph Aiello; Robert Michael Pelstring, both of Santa Cruz; Klaus Dieter Kloeppel, Watsonville, all of Calif.

[73] Assignee: Seagate Technology, Inc., Scotts Valley, Calif.

[21] Appl. No.: 08/974,277

[22] Filed: Nov. 19, 1997

Related U.S. Application Data

[60] Provisional application No. 60/031,377, Nov. 19, 1996.

[51] Int. Cl.$^6$ .............................. H02K 7/14; H02K 11/00
[52] U.S. Cl. .......................................... 310/67 R; 310/71
[58] Field of Search .................... 310/67 R, 71; 360/98.07, 99.04, 99.08

[56] References Cited

U.S. PATENT DOCUMENTS

| | | | |
|---|---|---|---|
| 4,458,228 | 7/1984 | Baumgartner | 310/71 |
| 5,442,248 | 8/1995 | Agnoff | 310/71 |
| 5,705,866 | 1/1998 | Oguchi | 310/67 R |
| 5,705,868 | 1/1998 | Cox et al. | 310/71 |

Primary Examiner—Clayton LaBalle
Attorney, Agent, or Firm—Flehr Hohbach Test Albritton & Herbert LLP

[57] ABSTRACT

An improved, simplified spindle motor design for use in a disc drive is provided, which utilizes a two-piece shaft and provides a central connector in the bottom section of the shaft which can be easily connected through the base to a power source for the motor. The improved spindle motor has a stator and motor connector which can be easily assembled into the spindle motor before the bearings and other elements are installed so that the cleaning and soldering of the stator and motor connector can be efficiently achieved. Further, the spindle and motor connector design incorporates an effective electrical grounding path between the stator and the central shaft of the spindle motor.

12 Claims, 4 Drawing Sheets

SPINDLE MOTOR WITH TWO-PIECE SHAFT AND CONNECTOR

CROSS REFERENCE TO RELATED APPLICATIONS

This application is based on U.S. Provisional patent application, Ser. No. 60/031,377 filed Nov. 19, 1996, assigned to the assignee of this application and incorporated herein by reference.

FIELD OF THE INVENTION

This invention is directed generally to the field of disc drives, and more specifically to an improved spindle motor design for use in disc drives.

BACKGROUND OF THE INVENTION

Winchester disc drives are being used in computers to store increasingly large amounts of information the typical Winchester disc drive is a system with a limited number of mechanical parts, including a spindle motor which mounts one or more discs for constant speed rotation, and an actuator carrying a transducer at one end and a voice coil motor at the other and operable in response to commands to the voice coil motor to position the transducer over a selected track to read and write data.

As one of the most expensive elements of a disc drive, as well as being one of the largest and most mechanically complex, many design efforts are intended to minimize the cost and ease of assembly of the spindle motor. This particular invention is especially directed to improving a spindle motor design which incorporates a central connector which extends through the bottom of the shaft and into and through the base of the disc drive, so that external connections can easily be made from below the motor to provide energizing current to the disc drive spindle motor. It is apparent that it is essential to provide a reliable connector from a source of external power to the stator of the spindle motor so that the motor can be reliably energized. A related problem posed by stator motors with such a central connector is how to provide an effective electrical grounding path between the stator and the shaft, without resorting to an unduly complex motor assembly.

SUMMARY OF THE INVENTION

Therefore, it is an object of the present invention to provide an improved spindle motor design for use in a disc drive.

A related invention is to provide a simplified spindle motor design utilizing a two-piece shaft, and providing a central connector in the bottom section of the shaft which can be easily connected through the base to a power source for the motor.

A related objective of the invention is to provide an improved spindle motor having a stator and motor connector which can be easily assembled into the spindle motor before the bearings and other elements are installed so that the cleaning and soldering of the stator and motor connector can be efficiently achieved.

Yet another related invention is to provide a spindle and motor connector design which incorporates an effective electrical grounding path between the stator and the central shaft of the spindle motor.

These and other objectives of the invention are provided by a spindle motor incorporating a split shaft with a hollow center and a slot in the lower end. A stator connector subassembly is separately completed, cleaned, soldered and tested. The stator connector subassembly is then inserted into a hollow lower of the two section shaft; a simple slot in one section of the shaft allows for the FPC (flexible printed circuit) to pass from the connector to the stator. After the connector is inserted into the upper section of the shaft, the lower section of the shaft is put in place, overlapping the upper, and the bearing holder, bearings, upper bearings and hub can be easily assembled to complete the assembly of the motor.

Other features and advantages of the present invention will be better understood by reference to the following figures and the detailed description of an exemplary embodiment given in conjunction with these figures.

DETAILED DESCRIPTION OF THE PREFERRED EMBODIMENT

Figure 1:
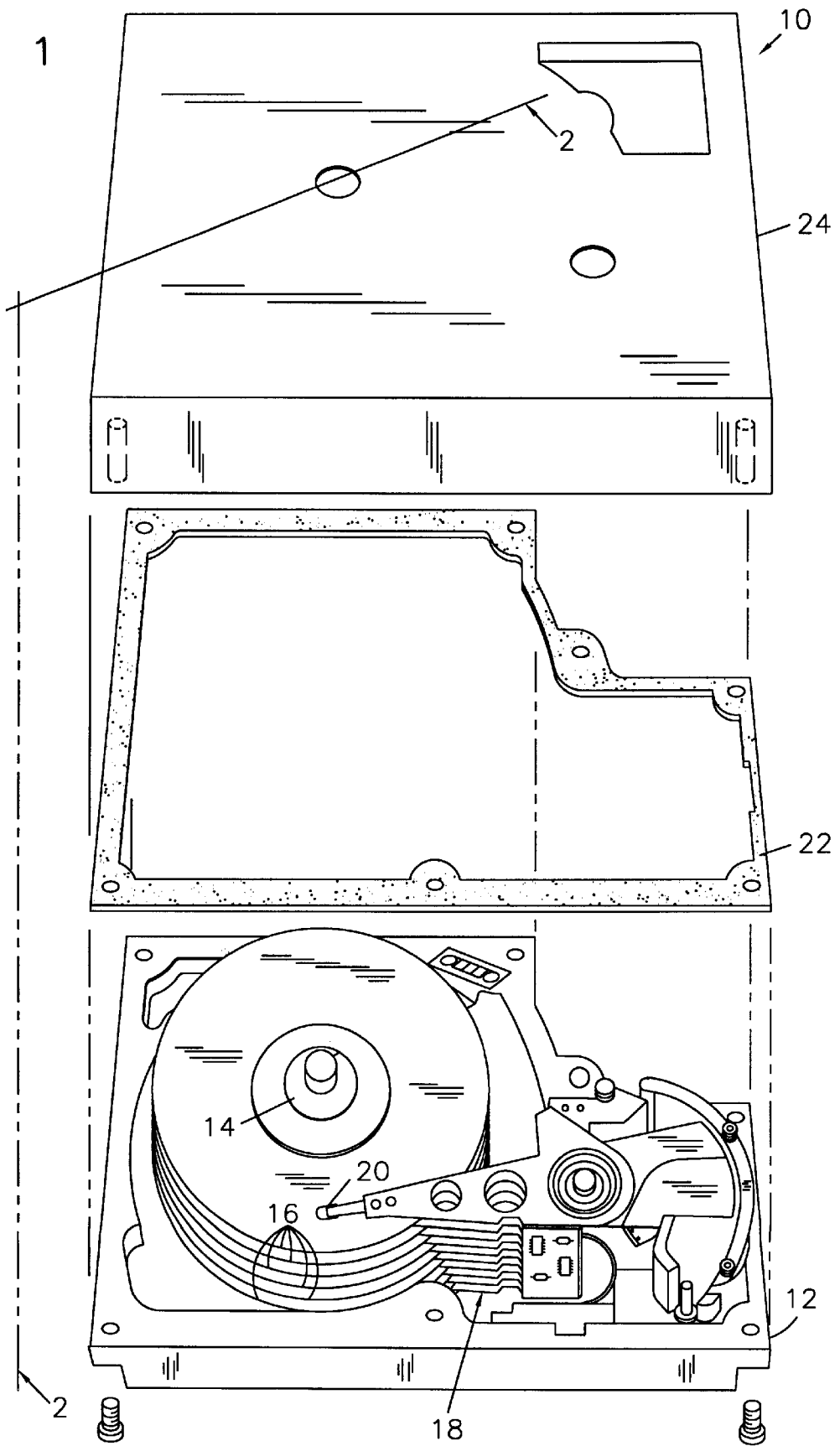
FIG. 1 is a plan view of a disc drive in which the present spindle motor is useful.

FIG. 1 is an exploded perspective view of a magnetic disc drive storage system in which the present motor could be used. However, clearly this motor is not limited to use with this particular design of a disc drive, nor is it indeed limited for use only in disc drives. Rather, given the many advantages which this invention achieves, it would be particularly useful in any motor design incorporating a connector plug into a hollow central shaft.

In this particular example of FIG. 1, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surface of discs 16 at selected locations. The discs rotate at very high speeds, several thousand RPM, in order to maintain the transducers flying over the surface of the disc. In present day technology, the spacing distance between the transducer and the rotating disc surface is measured in micro inches; thus it is absolutely essential that the spindle motor be reliable in operation in terms of maintaining constant speed of operation, while not susceptible to vibration.

Figure 2:
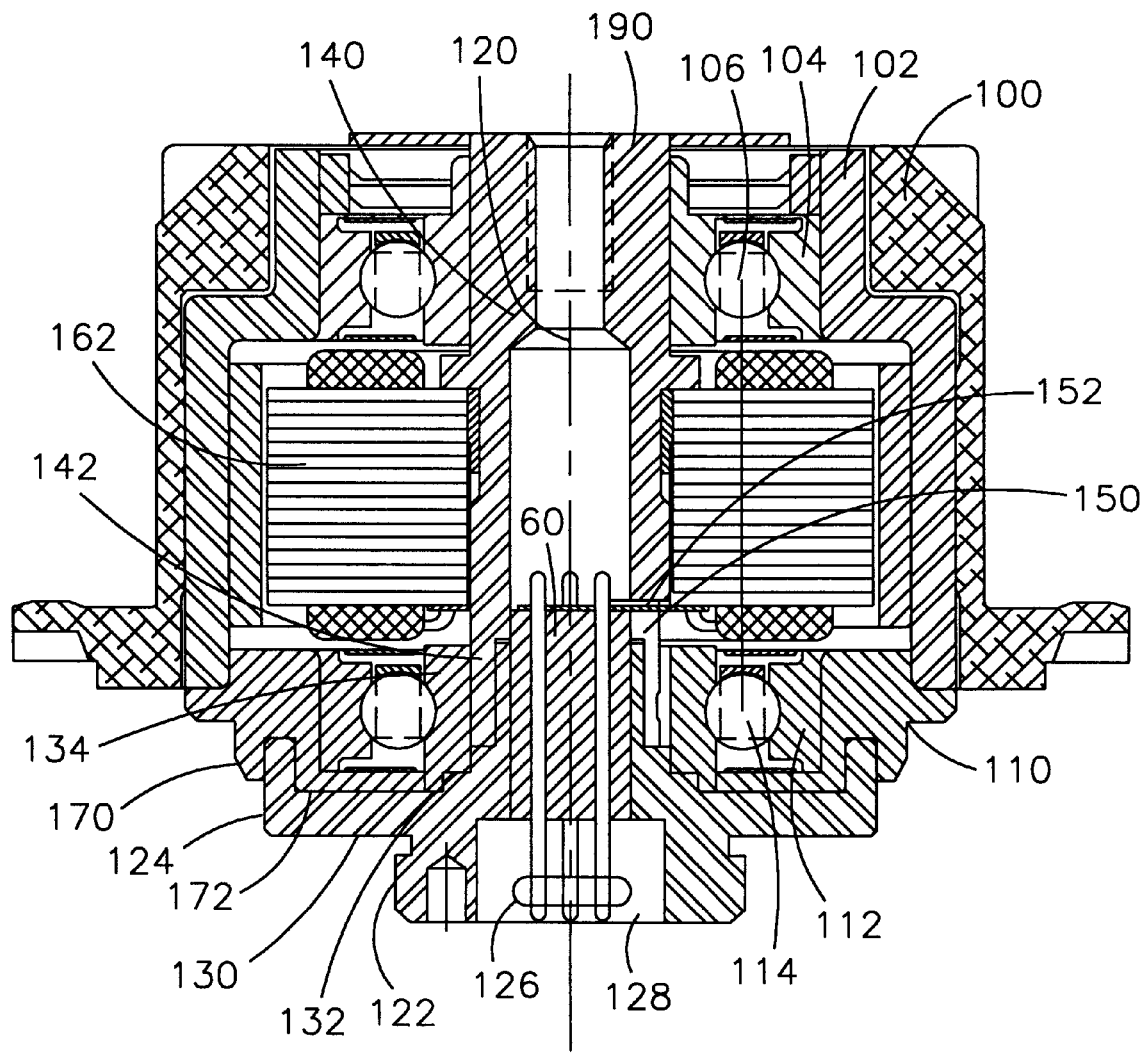
FIG. 2 is a vertical sectional view of a spindle motor designed in accordance with the present invention showing the two-piece central shaft, the stator connector assembly, the grounding clip which may be desired in this design, and other features of the present invention.

Referring next to FIG. 2, the figure shows the primary pieces of an exemplary motor in which the present invention is used, as well as the combined stator/connector assembly (which will be discussed in detail with respect to FIG. 3). As shown, the motor supports a hub 100 with a back iron 102, which are supported for rotation from the outer race 104 of the upper bearing 106 and are further supported by the bearing holder 110 and the outer race 112 of the lower bearing 114. The figure further shows a two-piece shaft 120 which in this design is intended to be a stationary shaft having a threaded flange 122 on its base section 124 so that it may easily be incorporated into the base section of a disc drive housing such as was shown in FIG. 1. A three prong connector generally indicated at 126 protrudes from a recess 128 in the bottom section of lower shaft section 122 so that an easy power supply connection from an external power source can be provided; the same prongs extend to the top of the connector and contact a means for providing a cylindrical connection to the stator 162.

The lower shaft section 122 ends in an upright cylindrical piece 130 which defines the cavity in which the connector will be located. This lower shaft section also includes a shoulder 132 which is used to locate the inner race 134 of the lower bearing. This allows the lower bearing inner race to precisely align the two shaft sections.

The shaft 120 further includes an upper shaft section 140 whose lower cylindrical portion 142 is U-shaped so that it fits over the section 132 of the lower shaft portion 122. The inner race of the lower bearing is critical in providing the necessary alignment between the two shaft sections 122, 140. It is apparent in both FIG. 2 and FIG. 4 that the two shaft sections have sleeve sections 132, 142 which overlap in the region adjacent this bearing race. This reinforces the necessary critical alignment of the shaft with the motor's spin axis. Preferable the upper shaft section is fully supported by the inner race of one bearing and about 60% supported by the inner race of the other bearing. Further, this shaft section 140 includes a cutout region 150 so that an FPC 152 or similar connector wires can pass from the connector 160 to the stator 162 which is mounted on the outer surface of this upper shaft section 140.

Before leaving this figure, it should be noted that the lower bearing holder 110 includes a U-shaped region 170 through which an upraised finger 124 of the base section 122 is located. Further, this lower bearing holder beyond the U-shaped section includes extension 172 which extends radially inward from the outer race 112 and underneath the ball bearing 114. This arrangement aids in preventing particles generated by this mechanical ball bearing from escaping from the internal motor region into the internal portion of the disc drive.

Figure 3:
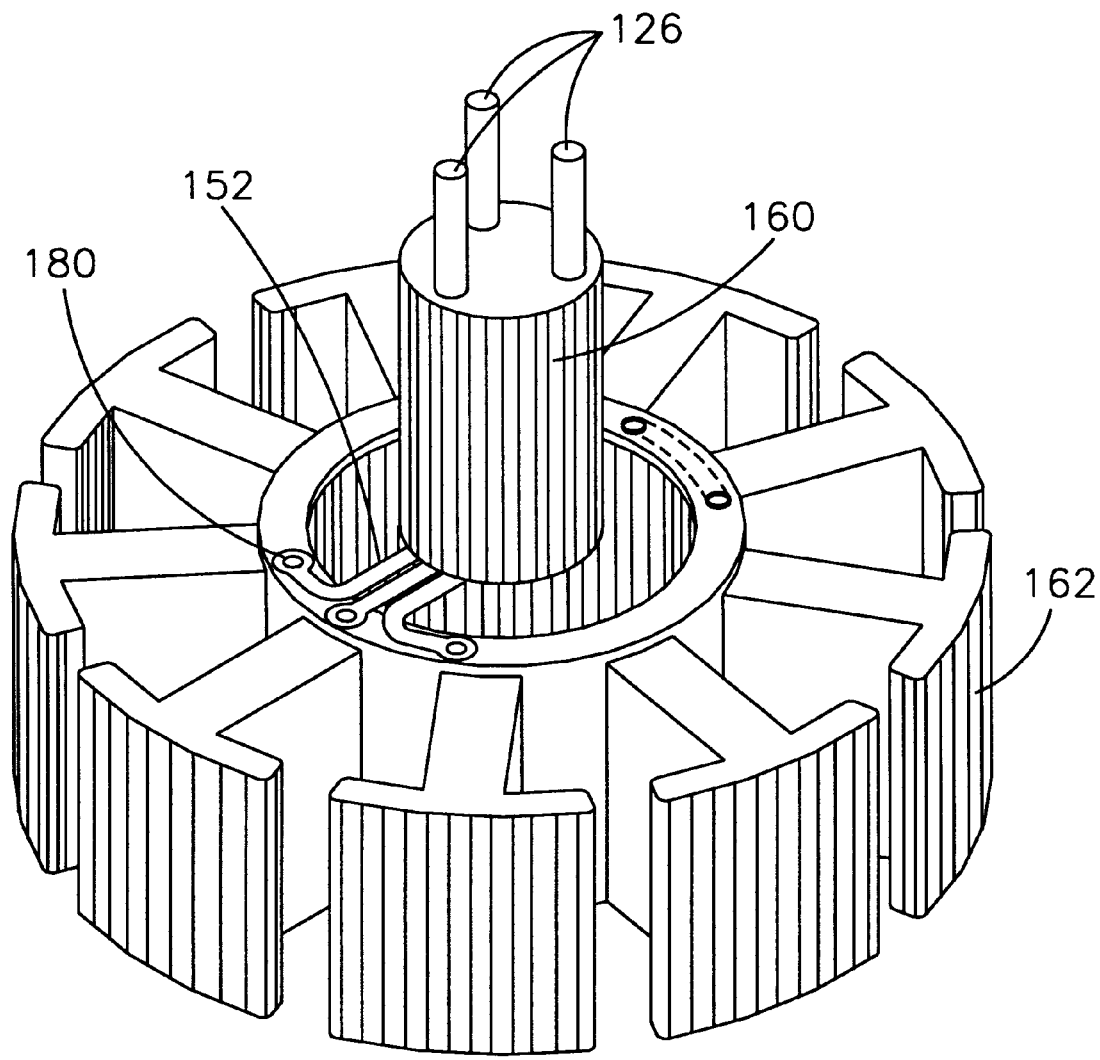
FIG. 3 shows the stator/connector assembly, after the assembly is completed but before the stator is wound.

FIG. 3 shows the details of the stator 162 and connector 160 assembly. The assembly is shown without the windings being in place; it is well known that the windings could be soldered to the connector points 180 and wound around the fingers shown so that a complete testable unit is established. It can also be seen that the FPC 152 which extends from the connector 160 located inside the shaft 120 to the stator 162 which is mounted on the outside of the upper section 140 of the shaft 120 will pass through the opening 150 which is defined in this upper section of the shaft. The three prongs 126 which appear at the bottom of FIG. 2 appear at the top of FIG. 3 because the assembly is shown inverted in FIG. 3; it would have to be rotated 180° to be in the orientation in which it appears in FIG. 2 and ready to be inserted in the motor shaft as the motor is assembled.

It should also be noted that the region of the shaft 120 above the connector 160 is shown as being solid. The topmost section 190 of this shaft could in fact be threaded so that a screw can be threaded through the top of the housing and into the top section 190 of this shaft 120 to provide added stability to the motor. Obviously also this system is equally useful where the region above the connector which is shown here as being solid is in fact hollow. Further, comparison of FIG. 2 and FIG. 3 would quickly establish that the opening 150 only needs to be of sufficient extent to let the FPC 152 pass through that opening; the remaining region of the sleeve formed by the upper shaft section would be solid in order to make the shaft as stable and vibration free as possible.

A further advantage of the 2 piece shaft design is that less metal is required because the width of the base portion would ordinarily require starting out with a piece of metal of that width in order to form a single piece shaft. However, the use of the two-piece interlocking shaft eliminates much of the metal which would otherwise be used to form the shaft.

Figure 4:
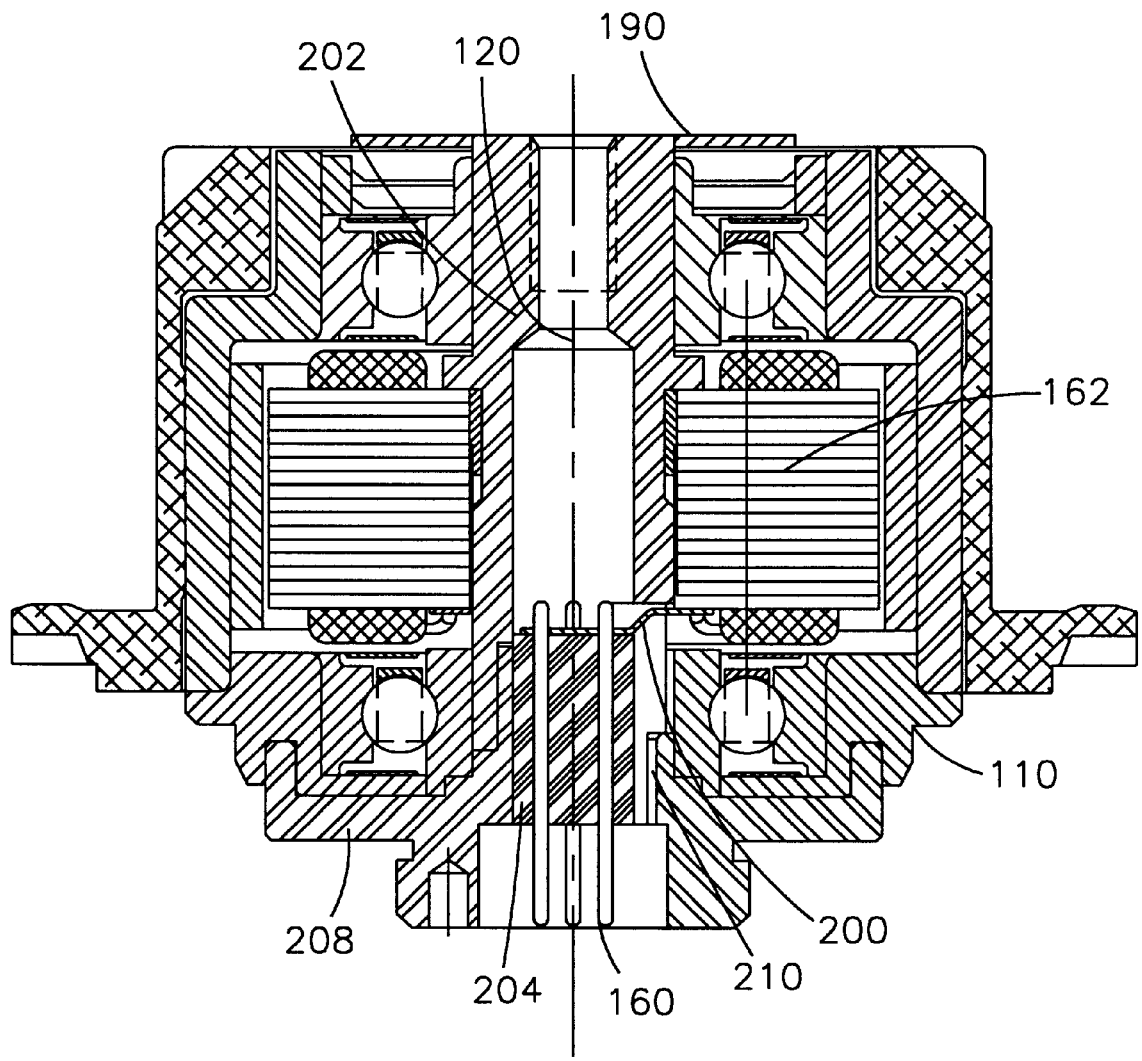
FIG. 4 is a vertical sectional view of an alternative embodiment of the design of FIG. 2.

Finally, a further alternative appears in FIG. 4 where the FPC connector 200 is shown bent in the region where it extends between the stator 162 and the connector 160. Incorporating this bent region 200 tends to absorb vibrations which might otherwise pass between the stator and the connector, as well as accommodating mis-alignment. A further change appears in that the sleeve 202 forming the upper portion of shaft 120 now defines the entire circumferential section 204 in which the connector 160 is inserted. This is the preferred embodiment. This region 204 also supports the inner race of the bearing. The inner race of the bearing is further supported from the base section 208 which includes a region 210 mating with the upper sleeve 204. In this design, since the slot 210 is of greater extent, the connector receives slightly less support than it does in the alternative shown in FIG. 2.

Other features and advantages of the present invention may be apparent to a person of skill in the art who studies this disclosure. Therefore, the scope of the invention is to be limited only by the following claims.

What is claimed is:

1. A disc drive spindle motor comprising:
   a central shaft adapted to be supported in a base of said disc drive,
   bearings mounted on said shaft and supporting a hub for rotation about said shaft, said hub supporting a magnet on an interior surface thereof,
   an integrated stator/connector assembly comprising a stator supported on an external surface of said shaft,
   a cylindrical connector inserted in a lower portion of said shaft so that said connector is accessible from below said shaft, and
   an electrical connection from said cylindrical connector to said stator, said central shaft comprising first and second pieces, a first piece of said shaft comprising a base for said motor and a cylindrical sleeve shaped section supporting a lower one of said bearings on an outer surface, and supporting said cylindrical connector on an inner surface, and said shaft further comprising a second hollow segment defining a remaining length of said shaft and overlapping said cylindrical sleeve of said base portion of said shaft and further supporting said stator on an outer surface thereof.

2. A motor as claimed in claim 1 wherein pins included in said connector extend from both ends of said connector so that said pins at one end may be easily connected to said electrical connection to said stator, and pins at said second end of said connector can be easily accessed to supply power to said motor.

3. A motor as claimed in claim 1 wherein said electrical connection from said cylindrical connector to said stator is a flexible printed circuit which is connected at one end to said stator to provide electrical power to windings on said stator, and connected at another end to said pins extending from said cylindrical electrical connector.

4. A motor as claimed in claim 1 wherein said second hollow upper section of said shaft comprises a slot allowing for passage of said electrical connection from said cylindrical connector to said stator.

5. A motor as claimed in claim 4 wherein said bearings comprise upper and lower bearings, and said stator is mounted on said external portion of said upper hollow section of said shaft between said upper and lower bearings to minimize the size of said motor.

6. A disc drive spindle motor comprising:

a central shaft adapted to be supported in a base of said disc drive, bearings mounted on said shaft and supporting a hub for rotation about said shaft, said hub supporting a magnet on an interior surface thereof, an integrated stator/connector assembly comprising a stator supported on an external surface of said shaft, a cylindrical connector inserted in a lower portion of said shaft so that said connector is accessible from below said shaft, and an electrical connection from said cylindrical connector to said stator, said shaft comprising a first base portion supporting at least an inner race of a lower one of said bearings, and said shaft further comprises a second hollow portion overlapping an upraised portion of said base section of said shaft, said hollow upper portion of said shaft supporting said cylindrical connector therein to precisely locate and support said cylindrical connector.

7. A motor as claimed in claim 6 wherein said electrical connection comprises a flexible printed circuit extending from said cylindrical electrical connector to said stator, said flexible printed circuit being bent in the region between said connector and said stator to absorb vibration generated by said motor and accommodate misalignment.

8. A motor as claimed in claim 6 wherein pins included in said connector extend from both ends of said connector so that said pins at one end may be easily connected to said electrical connection to said stator, and pins at said second end of said connector can be easily accessed to supply power to said motor.

9. A motor as claimed in claim 6 wherein said electrical connection from said cylindrical connector to said stator is a flexible printed circuit which is connected at one end to said stator to provide electrical power to windings on said stator, and connected at another end to said pins extending from said cylindrical electrical connector.

10. A motor as claimed in claim 6 wherein said second hollow upper section of said shaft comprises a slot allowing for passage of said electrical connection from said cylindrical connector to said stator.

11. A motor as claimed in claim 10 wherein said bearings comprise upper and lower bearings, and said stator is mounted on said external portion of said upper hollow section of said shaft between said upper and lower bearings to minimize the size of said motor.

12. A spindle motor supporting a hub and one or more discs for constant speed rotation for use in a disc drive comprising means for supplying electrical signals to a stator for said motor to cause said constant speed rotation of said disc, and means for establishing alignment of a shaft of said motor with a spin axis of said motor, said shaft being a two piece shaft, said means for establishing alignment comprising bearing means for supporting said hub for rotation about said spin axis, said shaft having first and second sections overlapping adjacent one of said bearing means.

* * * * *